United States Patent Office

2,737,526
Patented Mar. 6, 1956

---

2,737,526

PROCESS FOR THE MANUFACTURE OF HYDROXY-PHENYLSERINES

Gustav Ehrhart, Frankfurt am Main Hochst, and Heinrich Ott, Eppstein, Germany, assignors to Farbwerke Hoechst Aktiengesellschaft vormals Meister Lucius und Bruning, Frankfurt am Main Hochst, Germany, a German company No Drawing. Application April 29, 1952, Serial No. 285,079

Claims priority, application Germany May 9, 1951

5 Claims. (Cl. 260—519)

The present invention relates to a process for the manufacture of hydroxy-phenylserines.

It is known that phenyl-serines can be made by the condensation of benzaldehyde with glycocoll with the use of an alkali hydroxide as condensing agent. However, the use of nitrobenzaldehyde, instead of benzaldehyde, does not result in the formation of nitrophenyl-serines if a solution of caustic alkali is used as condensing agent. The condensation of nitrobenzaldehyde and glycocoll is successful if an alkaline earth metal hydroxide is used as condensing agent, instead of an alkali hydroxide, and a good yield of the nitrophenyl-serine is obtained.

It is not possible to obtain hydroxyphenyl-serines by condensing a hydroxybenzaldehyde with glycocoll with the use of an alkali hydroxide or alkaline earth metal hydroxide as condensing agent.

Now, we have found that hydroxyphenyl-serines can be obtained in very good yield by reacting a hydroxybenzaldehyde, of which the hydroxyl group or groups is or are protected by etherification with the benzyl radical, with glycocoll in the presence of an alkali hydroxide as condensing agent. After the condensation, the benzyl radical or radicals introduced for protection of the oxy group or oxy groups can easily be split off, for example, by catalytic hydrogenation or by hydrolysis with a hydrohalic acid, especially hydrobromic acid, under mild conditions, so as to regenerate the hydroxyl group or groups. There are suitable for the condensation benzaldehydes, the phenyl nucleus of which contains one or more hydroxyl groups etherified by the benzyl radical, for example, ortho-, meta- or para-benzyloxybenzaldehyde, 3.4-di-(benzyloxy)-benzaldehyde, 2.3 - di - (benzyloxy)-benzaldehyde, 2.5-di-(benzyloxy)-benzaldehyde, 3.5-di-(benzyloxy)-benzaldehyde, 2-benzyloxy-5-chlorobenzaldehyde, tribenzyloxybenzaldehyde and the like.

Alkali hydroxides, more especially sodium hydroxide, are used as condensing agent.

The condensation may be carried out at room temperature or at a raised temperature, and preferably at about 40° C.–about 80° C.

The following examples serve to illustrate the invention, but they are not intended to limit it thereto.

Example 1

A mixture of 282 grams of para-benzyloxybenzaldehyde, 450 cc. of alcohol, 50 grams of glycocoll, 67 grams of sodium hydroxide and 200 cc. of water is heated to about 50° C. After a short time the mixture solidifies to a thick crystalline magma. 1400 cc. of 2 N-hydrochloric acid are added to this magma, which is then mixed thoroughly and again heated for a short time at about 50° C. After cooling, the precipitated excess of para-benzyloxybenzaldehyde is filtered off with suction, the filtrate is clarified with charcoal, and sodium acetate is added until the solution no longer has an acid reaction towards Congo paper. Para-benzyloxyphenyl-serine precipitates. It melts at about 205° C. with decomposition.

In order to split off the benzyl group, 300 cc. of 2 N-hydrochloric acid are poured over 50 grams of para-benzyloxyphenylserine, palladium black is added, and the mixture is hydrogenated until about 4 litres of hydrogen have been absorbed. After the catalyst has been filtered off, the solution is concentrated to a small volume, and sodium acetate is added. Free para-hydroxyphenyl-serine crystallizes. It melts at about 195° C. with decomposition.

Ortho-benzyloxybenzaldehyde can be condensed with glycocoll in a similar manner. The ortho-benzyloxyphenyl-serine first obtained melts at 175° C.–177° C. with decomposition. Its benzyl group can then be split off by catalytic hydrogenation in the manner described above, yielding ortho-hydroxyphenyl-serine melting at 133° C.–135° C. with decomposition. Potassium hydroxide may be used as the condensing agent instead of sodium hydroxide.

Example 2

24.7 grams of 2-benzyloxy-5-chlorobenzaldehyde are digested in 40 cc. of alcohol. A solution of 3.7 grams of glycocoll and 5 grams of sodium hydroxide in 15 cc. of water is added, and the mixture is heated to about 60° C. yielding a clear solution. 100 cc. of 2 N-hydrochloric acid are added to the solution, and the reaction mixture is again heated for a short time at about 50° C. After cooling, the aldehyde, which has precipitated, is filtered off with suction, the filtrate is clarified with charcoal, and sodium acetate is added until the solution no longer shows an acid reaction towards Congo paper. 2-benzyloxy-5-chlorophenyl-serine precipitates. It melts at 180° C.–182° C. with decomposition.

In order to split off the benzyl group, 10 grams of 2-benzyloxy-5-chlorophenyl-serine are heated for 10 minutes, while stirring, with 30 cc. of hydrobromic acid of 48 per cent. strength at 90° C. on the steam bath. The liquid is diluted with three times its weight of water, the precipitated benzyl bromide is extracted with ether, and the aqueous solution is clarified with charcoal and concentrated under reduced pressure until almost dry. Concentrated sodium acetate solution is then added until the solution no longer shows an acid reaction towards Congo paper. 2-hydroxy-5-chlorophenyl-serine very soon commences to crystallize. After drying, it decomposes at about 195° C.

2-benzyloxy-5-chlorobenzaldehyde can be prepared in the following manner: A solution of 28 grams of potassium hydroxide in 300 cc. of alcohol is poured over 78 grams of 2-oxy-5-chlorobenzaldehyde, 63 grams of benzyl chloride are added, and the mixture is boiled for one hour under reflux. Dilute sodium hydroxide solution is added, whereupon 2-benzyloxy-5-chlorobenzaldehyde precipitates. It melts at 78° C.–79° C.

Example 3

136 grams of 3.4-dibenzyloxy-benzaldehyde are suspended in 550 cc. of alcohol. A solution of 21.4 grams of sodium hydroxide and 16 grams of glycocoll in 70 cc. of water is added, and the mixture is heated on the steam bath to about 60° C.–65° C. to yield a clear solution. 500 cc. of 2 N-hydrochloric acid are added, and the precipitated product is filtered off with suction. The filtrate is clarified with charcoal, and sodium acetate is added until the solution no longer shows an acid reaction towards Congo paper. 3.4-di-(benzyloxy)-phenyl-serine precipitates. After redissolution in dilute hydrochloric acid, filtration, and precipitation with sodium acetate, the resulting 3.4-di-(benzyloxy)-phenyl-serine melts at 138° C.–140° C. with decomposition.

In order to split off the benzyl groups, 7.8 grams of 3.4-di-(benzyloxy)-phenyl-serine are suspended in 500 cc. of methanol of 50 per cent. strength and shaken with palladium black and hydrogen at a temperature of 40° C. until the calculated quantity of hydrogen has been taken up. After filtering, the solvent is removed, for example, by distillation, and the residual 3.4-dihydroxy-phenyl-serine is recrystallized from a small amount of water. It decomposes at 218° C.–220° C.

We claim:

1. A process for the manufacture of hydroxyphenyl-serines which comprises reacting benzyloxy-benzaldehydes with glycocoll in the presence of an alkali hydroxide and subsequently splitting off the benzyl radicals by treating the reaction products with a member selected from the group consisting of catalytically activated hydrogen and hydrobromic acid.

2. A process for the manufacture of hydroxy-phenyl-serines which comprises reacting benzyloxy-benzaldehydes with glycocoll in the presence of an alkali hydroxide and subsequently subjecting the reaction products to a catalytic hydrogenation.

3. A process for the manufacture of hydroxy-phenyl-serines which comprises reacting benzyloxy-benzaldehydes with glycocoll in the presence of an alkali hydroxide and subsequently subjecting the reaction products to a hydrolysis by means of hydrobromic acid.

4. A process for the manufacture of hydroxy-phenyl-serines which comprises reacting a monobenzyl-oxy-benzaldehyde with glycocoll in the presence of an alkali hydroxide and subsequently splitting off the benzyl radical.

5. A process for the manufacture of ortho-hydroxy-phenyl-serine which comprises reacting ortho-benzyloxy-benzaldehyde with glycocoll in the presence of an alkali hydroxide and subsequently splitting off the benzyl radical.

References Cited in the file of this patent

FOREIGN PATENTS 632,424   Germany _____ July 8, 1936

OTHER REFERENCES

Rosenmud et al.: Beilstein (Handbuch 4th ed.), vol. 14, 1st sup., page 683 (1933).

Rosenmud et al.: Berichte, vol. 52, pp. 1734–1749 (1919).

Kanao et al.: Chem. Ab., vol. 45, page 9508 (1951).